United States Patent
Barrenscheen et al.

(10) Patent No.: US 8,271,816 B2
(45) Date of Patent: Sep. 18, 2012

(54) SYSTEM AND METHOD FOR STATISTICS RECORDING OF POWER DEVICES

(75) Inventors: Jens Barrenscheen, Munich (DE); Giuseppe Bernacchia, Padovana (IT); Martin Krueger, Munich (DE); Erwin Huber, Munich (DE)

(73) Assignee: Infineon Technologies Austria AG, Villach (AT)

( * ) Notice: Subject to any disclaimer, the term of this patent is extended or adjusted under 35 U.S.C. 154(b) by 768 days.

(21) Appl. No.: 12/046,372

(22) Filed: Mar. 11, 2008

(65) Prior Publication Data

US 2009/0234980 A1 Sep. 17, 2009

(51) Int. Cl.
*G06F 1/26* (2006.01)

(52) U.S. Cl. .......... 713/321; 713/340

(58) Field of Classification Search .......... 713/321, 713/322, 323, 340, 502; 455/574, 343.2, 455/343.5
See application file for complete search history.

(56) References Cited

U.S. PATENT DOCUMENTS

| | | | |
|---|---|---|---|
| 5,534,766 A | | 7/1996 | Bonissone et al. |
| 5,945,817 A | * | 8/1999 | Nguyen .......... 323/273 |
| 5,998,982 A | * | 12/1999 | Groeneveld et al. .......... 323/283 |
| 6,031,359 A | * | 2/2000 | Michelsen et al. .......... 320/141 |
| 6,150,798 A | * | 11/2000 | Ferry et al. .......... 323/273 |
| 6,184,659 B1 | * | 2/2001 | Darmawaskita .......... 320/139 |
| 6,236,189 B1 | * | 5/2001 | Franke .......... 320/136 |
| 6,476,665 B2 | * | 11/2002 | Buchschacher .......... 327/536 |
| 7,411,317 B2 | * | 8/2008 | Liu .......... 307/112 |
| 7,411,377 B2 | * | 8/2008 | Sutardja et al. .......... 323/282 |
| 7,548,767 B2 | * | 6/2009 | Kim et al. .......... 455/574 |
| 2001/0004206 A1 | * | 6/2001 | Buchschacher .......... 323/282 |
| 2003/0158609 A1 | * | 8/2003 | Chiu .......... 700/22 |
| 2004/0215408 A1 | * | 10/2004 | Lamer et al. .......... 702/63 |
| 2006/0091857 A1 | * | 5/2006 | Nakanishi et al. .......... 320/116 |
| 2006/0244570 A1 | * | 11/2006 | Leung et al. .......... 340/310.11 |
| 2007/0047270 A1 | * | 3/2007 | Makino et al. .......... 363/34 |

OTHER PUBLICATIONS

White, R.V., et al., "Data Communications Issues for Digital Power System Management," Sep. 20, 2005, pp. 1-17.

* cited by examiner

*Primary Examiner* — Khanh Dang
(74) *Attorney, Agent, or Firm* — Slater & Matsil, L.L.P.

(57) ABSTRACT

A system and method for statistics recording of power devices is disclosed. A power circuit includes a power device to provide a specified electrical power to a load and a host controller coupled to the power device. The host controller is configured to provide issue instructions to and retrieve status information from the power device. A communications and control interface (CCI) is coupled between the power device and the host controller. The CCI is configured to operate as a communications interface between the power device and the host controller and to retrieve and store status information from the power device. The CCI may be capable of performing statistical analysis on the status information to help reduce the amount of information exchanged between the host controller and the power device, thereby reducing bandwidth requirements.

21 Claims, 3 Drawing Sheets

SYSTEM AND METHOD FOR STATISTICS RECORDING OF POWER DEVICES

TECHNICAL FIELD

The present invention relates generally to a system and a method for power devices, and more particularly to a system and a method for statistics recording of power devices.

BACKGROUND

A power device may be an electronic device or devices that may be used to provide a desired form, type, or amount of electrical power to a load. Examples of power devices may include: switched mode power supplies, linear regulators, step up converters, step down converters, fly-back converters, AC/DC converters, rectifiers, inverters, frequency changers, interleaved and multiphase converters, and so forth. The analysis of the performance of power devices may be improved by providing a way for status information from the power devices to be communicated to a host controller. The host controller may be coupled to the power devices by a communications bus, such as a PMBus, for example. The host controller may then communicate with the power devices, issuing instructions and retrieving status information, for example. In situations when there are more than one power device coupled to the host controller, the power devices may share the communications bus. In addition to a communications bus, the host controller may be coupled to the power devices using a peer to peer interface.

A high bandwidth communications bus may be expensive. Therefore, a communications bus having a lower bandwidth may be used in more cost sensitive applications. Furthermore, when the host controller needs to communicate with a number of power devices, even the high bandwidth communications bus may not provide adequate bandwidth to provide timely delivery of status information or instructions. This may lead to a delay in the exchange of instructions and/or status information. For example, in the event of a failure of a power device, the host controller may need to be able to retrieve status information in order to analyze the nature of the failure of the power device. The delayed exchange of the status information may lead to erroneously timed status information. For example, status information arriving at the host controller may be invalid since the status information was from some time period in the past. To further complicate matters, status information may arrive at the host controller at different times and out of order, thereby invalidating the status information.

SUMMARY OF THE INVENTION

These and other problems are generally solved or circumvented, and technical advantages are generally achieved, by preferred embodiments, which provide a system and method for statistics recording of power devices.

In accordance with a preferred embodiment, a power circuit is provided. The power circuit includes a power device to provide a specified electrical power to a load, a host controller coupled to the power device, the host controller configured to provide issue instructions to and retrieve status information from the power device, and a communications and control interface (CCI) coupled in between the power device and the host controller, the CCI configured to operate as a communications interface between the power device and the host controller and to retrieve and store status information from the power device.

The foregoing has outlined rather broadly the features and technical advantages of the embodiments in order that the detailed description of the embodiments that follows may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the invention. It should also be realized by those skilled in the art that such equivalent constructions do not depart from the spirit and scope of the embodiments as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a switched mode power supply connected to and communicating with a host controller. The invention may also be applied, however, to other power devices, such as linear regulators, step up converters, step down converters, fly-back converters, AC/DC converters, rectifiers, inverters, frequency changers, and so forth, that may be connected to and communicating with a host controller. Additionally, the invention may also be applied to other applications wherein there is a desire to reduce communications bandwidth requirements between a device and its controller.

A technique that may help to reduce the amount of information transmitted over a communications bus is to process some or all of the information prior to transmitting the information over the communications bus. Then, only the results of the processing may be transmitted, not unprocessed information.

Figure 1:
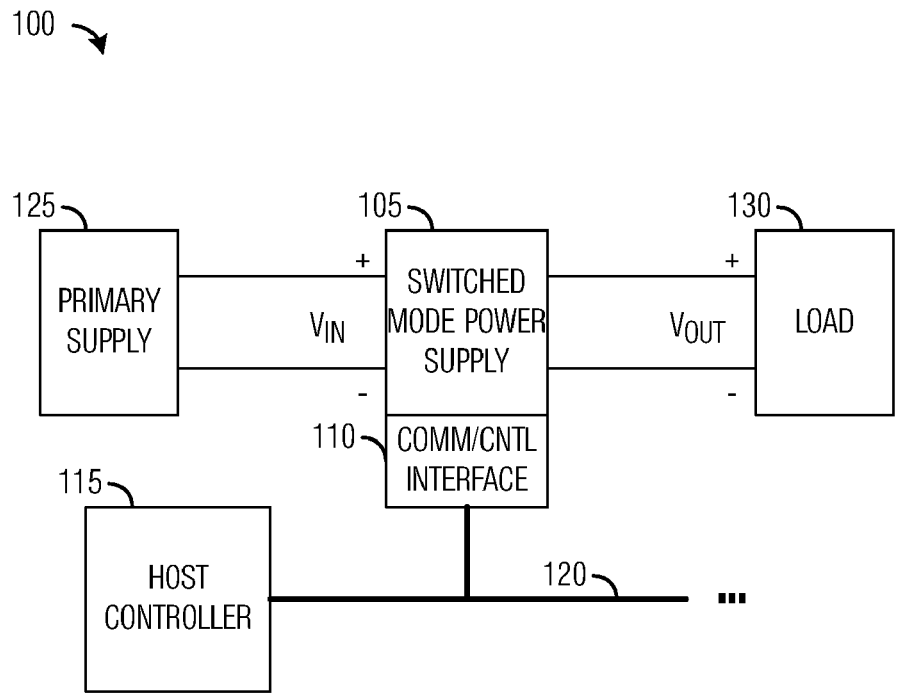
FIG. 1 is a diagram of a switched mode power supply system.

With reference now to FIG. 1, there is shown a diagram illustrating a switch mode power supply (SMPS) system 100. The SMPS system 100 includes a SMPS 105 that includes a communications and control interface (CCI) 110 that may permit the SMPS 105 to communicate with a host controller 115 via a communications bus 120. The CCI 110 may also be able to perform processing on at least some of the information from the SMPS 105. The SMPS 105 may send and receive status information to the host controller 115 as well as receive instructions, control information and data, and so forth, from the host controller 115. The SMPS system 100 also includes a primary supply 125 and a load 130. The SMPS system 100 takes at least one input voltage, $V_{IN}$, as provided by the primary supply 125, and transforms it (or them) into at least one output voltage, $V_{OUT}$, supplying it (or them) to the load 130.

The host controller 115 to the SMPS 105 may be connected only when there is a need to exchange information, such as when the host controller 115 issues instructions and/or control information and data to the SMPS 105 or when it is sending/receiving status information from the SMPS 105. Alternatively, the host controller 115 and the SMPS 105 may be connected continuously.

Although the discussion focuses on a system using switched mode power supplies, the present invention may be applicable to other forms of power devices, such as linear regulators, step up converters, step down converters, fly-back converters, AC/DC converters, interleaved and multiphase converters, rectifiers, inverters, frequency changers, and so forth. Therefore, the discussion of switched mode power supplies should not be construed as being limiting to either the scope or the spirit of the present invention.

Figure 2:
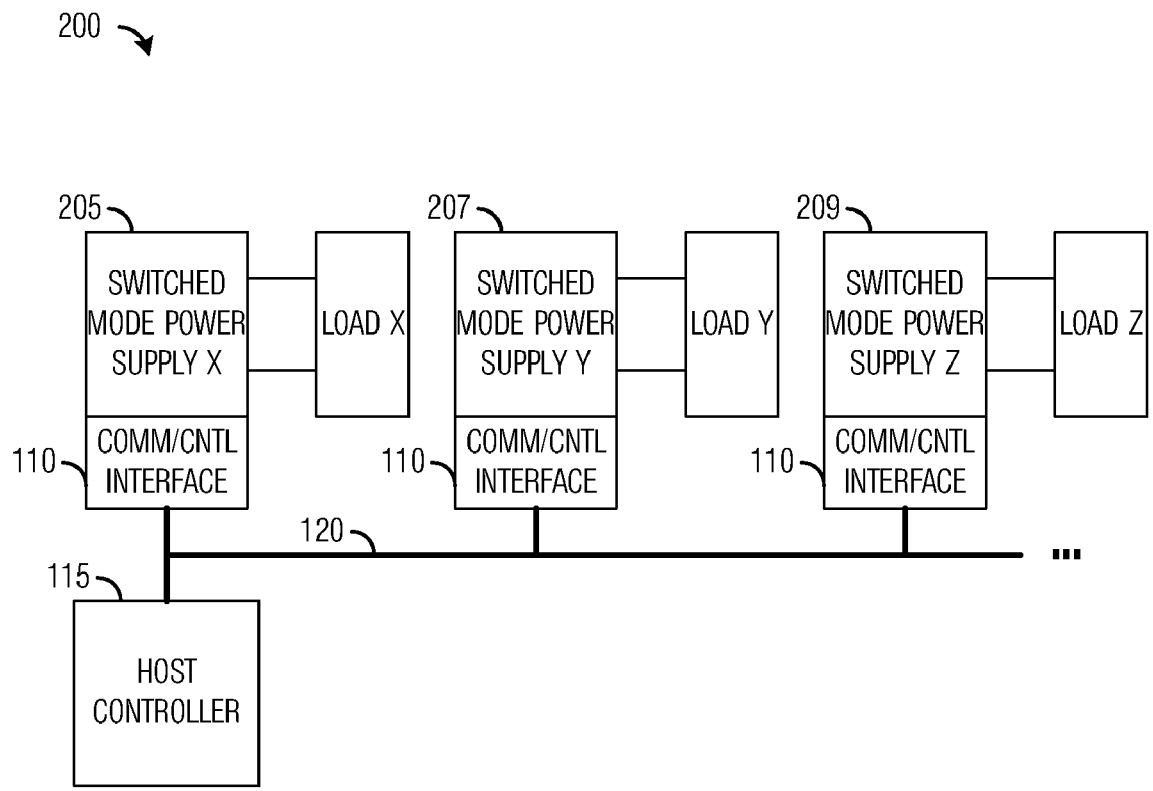
FIG. 2 is a diagram of a switched mode power supply system having multiple switched mode power supplies.

FIG. 2 illustrates a SMPS system 200 having multiple SMPS, such as SMPS 205, SMPS 207, and SMPS 209, with each SMPS driving a different load. The SMPS may be identical to one another or there may be several different types of SMPS. Each SMPS may include a CCI, such as the CCI 110. A host controller 115 may be coupled to each SMPS via a communications bus 120. The host controller 115 may individually transmit and receive information to and from each SMPS over the communications bus 120. Additionally, the host controller 115 may simultaneously transmit to more than one SMPS at one time.

Figure 3A:
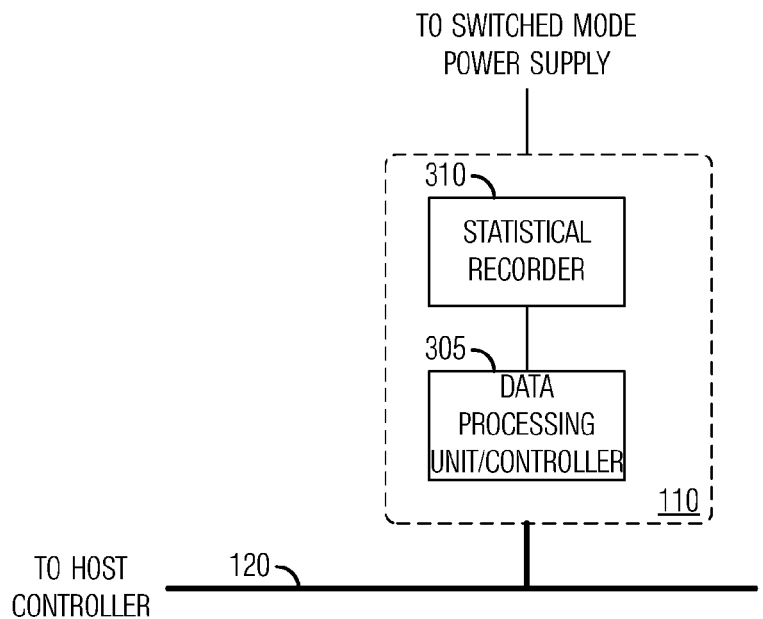
FIG. 3a is a diagram of a high-level view of a communications and control interface.

FIG. 3a illustrates a high-level view of a CCI 110. The CCI 110 may be used to enable communications between a SMPS, such as SMPS 105, and a host controller, such as host controller 115. The CCI 110 may encode and format information from the SMPS 105 into a format suitable for transmission over a communications bus, such as the communications bus 120, to the host controller 115. Additionally, the CCI 110 may decode and reformat a transmission received over the communications bus 120 from the host controller 115 to produce information and provide the information to the SMPS 105. A data processing unit/controller 305 in the CCI 110 may be used to perform the encoding/decoding/formatting operations.

The CCI 110 also includes a statistical recorder unit 310 coupled to the data processing unit/controller 305. The statistical recorder unit 310 may be used to record status information from the SMPS 105. The statistical recorder unit 310 may also store the status information. In addition to storing the status information, the statistical recorder unit 310 may be capable of putting a time stamp on the status information. The assignment of a time stamp to status information may help in subsequent processing of the status information by ensuring an accurate tracking of status information. For example, a time stamp may help to identify which SMPS first detected a fault and how the fault propagated in a SMPS system having multiple SMPS. Furthermore, the statistical recorder unit 310 may be capable of performing some processing of the status information. For example, the statistical recorder unit 310 may be capable of computing a mean or a variance of a sequence of values.

The statistical recorder unit 310 in combination with the data processing unit/controller 305 may also be capable of performing statistical analysis of status information from the SMPS 105. As discussed earlier, statistical processing of the status information may enable a reduction in bandwidth requirements on the communications bus 120 by reducing the amount of information that the SMPS 105 may need to transmit to the host controller 115. For example, rather than sending a large amount of status information, the statistical recorder 310 and the data processing unit/controller 305 may compile a histogram of the status information and transmit only the histogram information to the host controller 115. Typical histogram information includes different values and a count associated for each value. Examples of histograms that may be created from the status information may include duty cycle histograms, voltage level histograms, current level histograms, phase angle histograms, output voltage ripple, input voltage ripple, load values, average on time, signal deviation percentage, operating temperature, voltage, current, and so on.

Figure 3B:
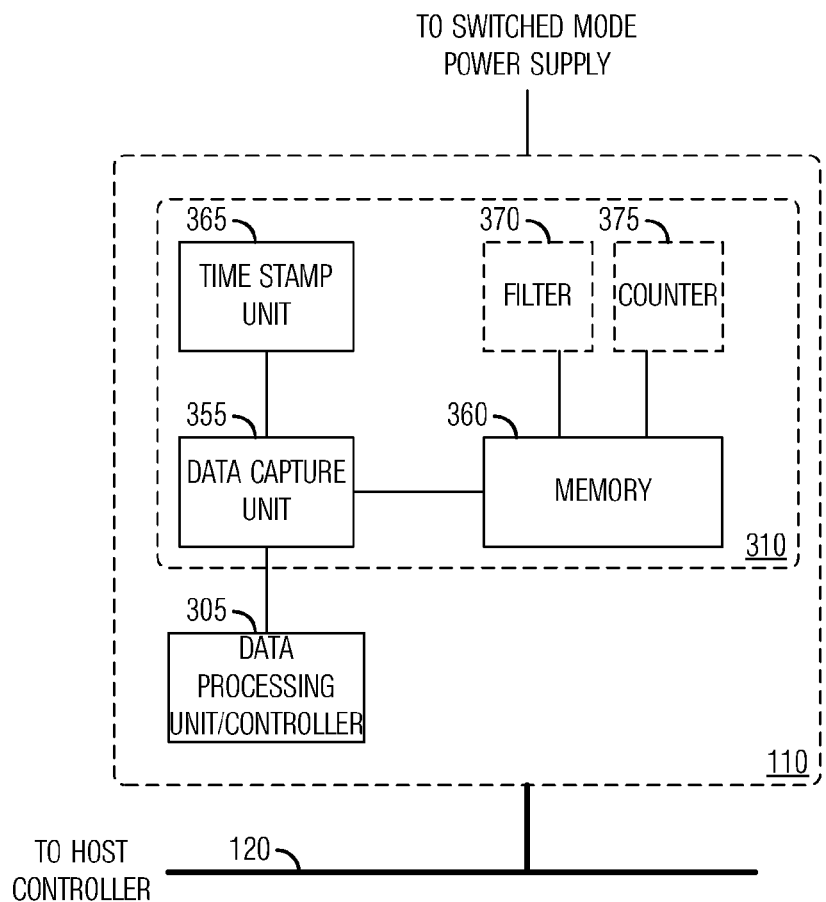
FIG. 3b is a diagram of a communications and control interface with emphasis provided to a statistical recorder unit.

FIG. 3b illustrates a high-level view of a CCI 110 with emphasis provided to a statistical recorder unit 310. The statistical recorder unit 310 includes a data capture unit 355. The data capture unit 355 may be able to retrieve status information from the SMPS 105 and store the status information in a memory 360. The memory 360 may be a non-volatile memory to help ensure the integrity of the stored status information in the event of a catastrophic failure of the SMPS 105, for example. The data capture unit 355 may be configured to retrieve the status information periodically by instruction from the host controller 115. Alternatively, the data capture unit 355 may retrieve the status information from the SMPS 105 when a specified event occurs. For example, the data capture unit 355 may retrieve status information from the SMPS 105 when a fault of some type is detected in the SMPS 105, when a signal reaches, rises above, or falls below a specified value, or when a metric (for example, temperature) reaches, rises above, or falls below a specified value, and so forth.

To further reduce the amount of status information that is collected and subsequently transmitted to the host controller 115, the amount of status information that is collected and saved in the memory 360 may depend on the nature of the event that causes the status information to be retrieved. For example, for status information that is retrieved from the SMPS 105 at periodic intervals, a relatively small amount of information may be retrieved and the status information may be processed statistically and the status information may be discarded. On the other hand, if an error or fault triggered the retrieval of status information, then a relatively large amount of information may be retrieved and the entirety of the status information may be stored in the memory 360 without statistical processing.

The status information retrieved by the data capture unit 355 may be marked with a time stamp by a time stamp unit 365. The time stamp unit 365 may be a clock that may be periodically synchronized with a reference clock to help ensure accuracy. Alternatively, a less expensive clock may be utilized. For example, an inexpensive time stamp unit 365 may be created using a counter that counts the switching periods or multiples of the switching periods of the SMPS 105. The counter may also count a signal's edges, periods, and so forth. The time may then be derived from the count of the switching periods. This may be advantageous when used in a SMPS system that includes multiple SMPS, such as the SMPS system 200. The time stamp units in the SMPS system 200 may all be synchronized to the same switching period or some multiple of the switch period, yielding synchronized time bases in each of the SMPS in the SMPS system 200.

The statistical recorder unit 310 may also be capable of performing some statistical processing. For example, the statistical recorder unit 310 may include a filter 370 to compute an estimate of an average or a variance of a series of values over a period of time. The filter 370 may be implemented using a recursive or non-recursive filter. Furthermore, the statistical recorder unit 310 may include a counter 375. The counter 375 may be used to create histograms from the status information. To simplify design and reduce costs, the counter 375 may have a limited number of bits of precision and if the counter 375 overflows, the counter 375 may be set to a maximum value. More complex statistical processing may be performed in the data processing unit/controller 305, the host controller 115, or a processor coupled to the host controller 115.

Figure 4:
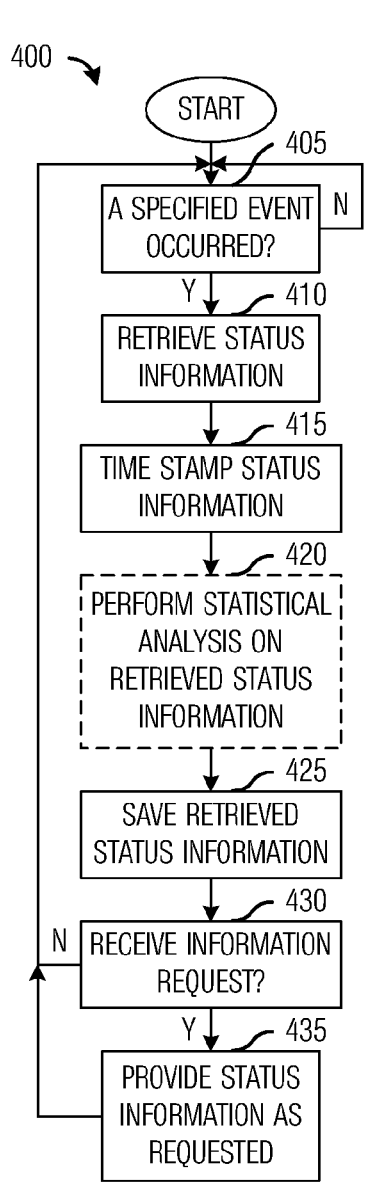
FIG. 4 is a diagram of a sequence of events in the retrieval and storage of status information by a communications and control interface.

FIG. 4 illustrates a sequence of events 400 in the retrieval and storage of status information for a SMPS by a CCI. The sequence of events 400 may occur in a CCI, such as the CCI 110 of the SMPS system 100 or the SMPS system 200. The events in the sequence of events 400 may occur while the SMPS system 100 or 200 is in a normal operating mode or when it is in a test/debug mode. When operating in the test/debug mode, the status information from the SMPS in the SMPS system 100 or 200 may be helpful in determining the performance as well as tracking and debugging faults that may exist.

The retrieval and storage of the status information may begin when an occurrence of a specified event is detected (block 405). The specified event may include a specified time, the elapsing of a specified amount of time, an error or fault, a signal (such as an output voltage or current or an input voltage or current) meeting, rising above, or falling below a specified value, a metric or measured value (for example, temperature) reaches, rises above, or falls below a specified value, an average or variance of a sequence of value reaches, rises above, or falls below a specified value, a specified histogram value reaches, rises above, or falls below a specified value, and so forth.

With the detection of the occurrence of the specified event (block 405), status information may be retrieved from the SMPS (or multiple SMPS) (block 410). As discussed previously, the amount of status information retrieved from the SMPS may be dependent on the nature of the specified event. For example, for retrievals of status information that occur regularly, less status information may be retrieved than for retrievals of status information resulting from a fault or error. The retrieved information may then be marked with a time stamp (block 415).

Once the status information has been retrieved from the SMPS and has been time stamped, the status information may receive optional statistical analysis (block 420). The optional statistical analysis may be performed in a statistical recorder unit, such as the statistical recorder unit 310, or in a data processing unit/controller, such as the data processing unit/controller 305. Examples of the optional statistical analysis may include computing an average or variance of a series of values, computing histogram information, and so forth. As discussed previously, the optional statistical analysis may be used to help reduce the amount of information transferred between the SMPS and the host controller 115. The use of the optional statistical analysis may also be dependent on the nature of the specified event. For example, the optional statistical analysis may be used on status information retrieved from periodic events, when a signal (such as an output voltage or current or an input voltage or current) meeting, rising above, or falling below a specified value, and so forth. If the specified event is a fault or an error, the optional statistical analysis may not be used.

The retrieved status information and/or computed statistical analysis information may then be saved (block 425). The status information and/or computed statistical analysis information may be saved in a memory, such as the memory 360. After storing the status information and/or the computed statistical analysis information, the retrieval and storage of the status information may begin again by waiting for an occurrence of a specified event (block 405). Alternatively, there may be a request to transfer the status information and/or the statistical analysis information (block 430), in response to which, the status information and/or the statistical analysis information may be transferred to the host controller 115 (block 435). The saving of the retrieved status information (block 425) and the receiving of a request to transfer the status information and/or statistical analysis information (block 430) may occur independently of each other. Therefore, they may occur in an order different from shown, one may occur without the other occurring, and so forth. After transferring the status information and/or the statistical analysis information to the host controller 115, the retrieval and storage of the status information may begin again by waiting for an occurrence of a specified event (block 405).

Figure 5A:
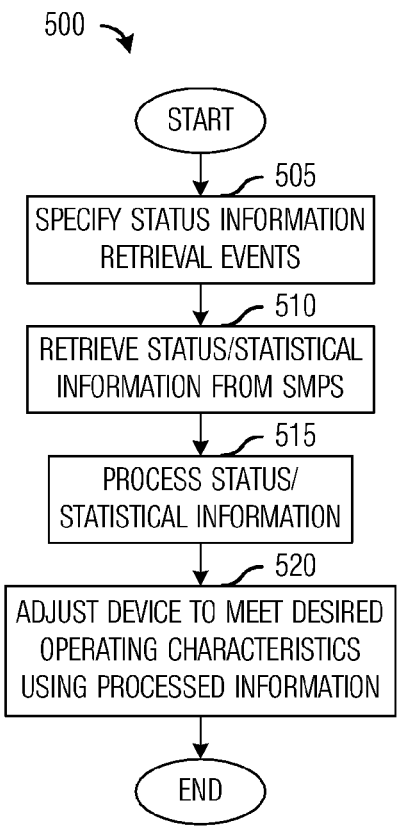
FIG. 5a is a diagram of a sequence of events in the use of status information of a switched mode power supply to adjust the performance of the switched mode power supply.

FIG. 5a illustrates a sequence of events 500 in the use of status information from a SMPS, such as the SMPS 105, by a host controller, such as the host controller 115, of a SMPS system, such as the SMPS system 100 or SMPS system 200, to adjust the performance of the SMPS 105 or to alter the SMPS 105 itself. The events in the sequence of events 500 may occur while the SMPS system 100 or 200 is in a normal operating mode or in a test/debug mode. When operating in the test/debug mode, the status information from the SMPS in the SMPS system 100 or 200 may be helpful in determining the performance as wells as tracking and debugging faults that may exist. Additionally, the events may occur during a product development phase of the SMPS system 100 or 200. In the product development phase, the sequence of events 500 may be useful in helping to ensure that the SMPS system 100 or 200 is meeting product specifications, requirements, or so forth.

Prior to retrieving and making use of status information from the SMPS 105, the host controller 115 may need to specify events that may result in the retrieval and storage of status information by the SMPS 105 (block 505). For example, the host controller 115 may specify a specific time when the SMPS 105 is to retrieve and store status information, alternatively, the host controller 115 may specify durations of time between successive retrievals and storage of status information. Additionally, the host controller 115 may specify desired signal values, percentages, and/or ranges, errors, faults, and so forth, that may trigger status information retrieval and storage.

With the specified event(s) specified by the host controller 115, the SMPS 105 may be permitted to operate and retrieve the status information as needed. The host controller 115 may then retrieve the status information (or statistical analysis information) from the SMPS 105 (block 510). For example, the host controller 115 may retrieve the status information from the SMPS 105 after the SMPS 105 has been operating for a specified amount of time or when the host controller 115 detects that an error or fault has occurred (or some other specified condition has been met) in the SMPS 105 (or another SMPS in the SMPS system 100 or 200).

With the status information and/or statistical analysis information retrieved from the SMPS 105, the host controller 115 may process the status information and/or statistical analysis information to determine the performance of the SMPS 105 (block 515). For example, the host controller 115 may process the status information and/or statistical analysis information to determine if the SMPS 105 is performing to specifications. Alternatively, the host controller 115 may process the status information and/or statistical analysis information to assist in determining a cause of a fault or error. After processing the status information and/or statistical analysis information, the host controller 115 may adjust the SMPS 105 so that the SMPS 105 meets the desired operating characteristics (block 520). Alternatively, the host controller 115 may adjust the SMPS 105 so that the SMPS 105 no longer fails or causes an error.

Figure 5B:
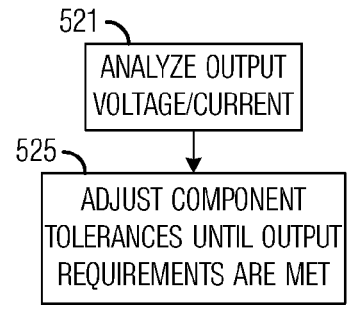
FIGS. 5b through 5e are diagrams of sequences of events of applications of the use of status information to adjust the performance of switched mode power supplies.

FIG. 5b illustrates an application of status information to adjust SMPS component tolerances. When designing a SMPS or a complete SMPS system, system designers will often need to specify an acceptable range of tolerances for components in the SMPS. For example, capacitors and resistors used in the SMPS may be specified as being 1%, 2%, 5%, 10%, or so forth, tolerance components, with the tighter tolerance components typically being more expensive.

It may be possible to make use of status information retrieved from a SMPS that is in operation to analyze output voltages and/or currents, for example, to determine a deviation from a specified output voltage and/or current (block 521). Using the output voltage and/or current information from the SMPS, the system designers may be able to adjust (relax/tighten) component tolerance values until the output voltage and/or current values meet specified tolerance values (block 525). For example, in order for the output voltage and/or current to meet a specified tolerance value, such as +/−5%, it may not be necessary to use 5% tolerance components in a SMPS. Rather, 10% tolerance components may be used and still meet the specified tolerance values. Therefore, the use of the status information may enable the use of less expensive components having loser tolerance values.

Figure 5C:
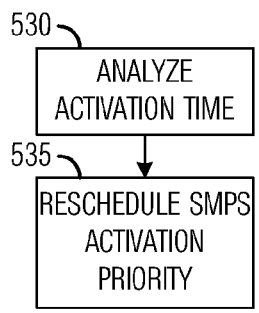

FIG. 5c illustrates an application of status information to adjust a SMPS operating in a multiphase converter system. Status information regarding output current may be provided to a host controller. Normally, all phases may be active under a full load condition. However, for lower load conditions, only a number of all phases may be active. Therefore, the host controller 115 may retrieve and analyze an activation time (block 530) and make adjustments to reschedule an activation priority for SMPS in the multiphase converter system to more evenly distribute operating stress and increase overall reliability (block 535). The activation time analyzed may be an average activation time, a peak activation time, an instantaneous activation time, and so forth.

Figure 5D:
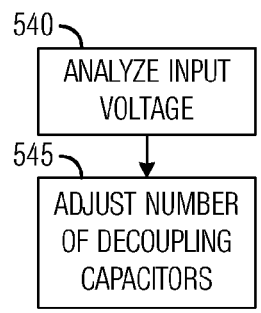

FIG. 5d illustrates an application of status information to adjust a SMPS operating in a power system. The host controller 115 may retrieve relevant information from SMPS, such as average input voltage, such as a battery voltage, and/or a standard deviation of input voltage. The input voltage information may be used for failure analysis, wherein an evaluation of decoupling capacitors is sufficient for input voltage values (block 540). The input voltage analyzed may be an average input voltage, a peak input voltage, an RMS input voltage, an instantaneous input voltage, and so forth. The host controller 115 may determine that there may be a need to increase or decrease a number of decoupling capacitors to improve performance (block 545). This form of analysis may be useful during a development or debug phase of the power system. For interleaved/multiphased systems, the host controller 115 may monitor a synchronization of the SMPS and shift a synchronization signal to optimize battery voltage ripple.

Figure 5E:
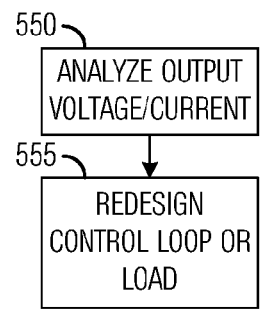

FIG. 5e illustrates an application of status information to adjust a SMPS using controlled variable statistics. A controlled variable, such as output voltage, output current, input voltage, input current, and so on, may be analyzed and monitored from status information (block 550). For example, the monitoring may comprise a percentage of time that the output voltage stays within a specified percentage of a desired value. The monitoring of the controlled variable may allow for a determination if there are design problems or load problems, for example. This may lead to a redesign of the system or the load (block 555).

In addition to the above discussed applications of status information, other possible uses of status information may include load analysis over time, which may be used for effective life time calculations with respect to temperature, voltage, current, and so forth. For example, through manipulation of source-to-drain and gate-to-source voltages, temperature, and/or current of a power device in the SMPS, it may be possible to predict a time to failure of the power device. The manipulation may take place in the statistical recorder 310 and the prediction may be provided to the host controller 115 or the host controller 115 may perform the manipulation and/or processing of status information provided by the statistical recorder 310 and makes the prediction by itself. Furthermore, in a situation wherein the load of the SMPS are lamps, such as fluorescent lamps, light emitting diodes, and so forth, it may be possible to correlate load temperature, current, and/or voltage, to lifetime or time to failure. Again, the statistical recorder 310 or the host controller 115 may be used to perform the manipulation and/or prediction. Additionally, duty cycle analysis may also be performed for min-max analysis.

Furthermore, the status information may also be used for production testing. Since the products themselves may report status information that typically may require other methods (such as fast sensors for analyzing responses to load transitions), the production testing may be simplified. Margin testing for production testing may also be simplified and made more reliable using status information.

Although the embodiments have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A power circuit comprising:
 a power device to provide a specified electrical power to a load;
 a host controller coupled to the power device, the host controller configured to issue instructions to and retrieve status information from the power device; and
 a communications and control interface (CCI) coupled between the power device and the host controller, the CCI configured to operate as a communications interface between the power device and the host controller, and to retrieve and store status information received from the power device, wherein the CCI comprises
  a data processing unit coupled to the power device, the data processing unit configured to process the status information into a form suitable for transmission to the host controller; and
  a statistical recorder coupled to the power device and to the data processing unit, the statistical recorder configured to retrieve the status information from the power device and to store the status information.

2. The power circuit of claim 1, wherein the host controller is selectively coupled to the power device, and wherein the host controller is coupled to the power device when issuing instructions and retrieving status information.

3. The power circuit of claim 1, wherein the statistical recorder comprises:
 a data capture unit to retrieve status information from the power device; and
 a memory coupled to the data capture unit, the memory configured to store the status information.

4. The power circuit of claim 3, wherein the statistical recorder further comprises a filter coupled to the memory, the filter to compute an average estimate or a variance estimate from status information stored in the memory.

5. The power circuit of claim 3, wherein the statistical recorder further comprises a counter coupled to the memory, the counter to compute histogram information from status information stored in the memory.

6. The power circuit of claim 5, wherein the memory is further configured to store the histogram information.

7. The power circuit of claim 3, wherein the statistical recorder further comprises a time stamp unit coupled to the data capture unit, the time stamp unit to assign a time value to status information.

8. The power circuit of claim 7, wherein the time stamp unit comprises a clock.

9. The power circuit of claim 7, wherein the time stamp unit comprises a counter configured to count switching periods, multiples of the switching periods of the power device, a signal's periods, or the signal's edges.

10. The power circuit of claim 1, wherein the host controller is further configured to adjust the operation of the power device based on the status information retrieved from the power device.

11. The power circuit of claim 1, wherein the power device comprises a plurality of power devices, and wherein the host controller is coupled to each power device of the plurality of power devices over a shared communications bus.

12. The power circuit of claim 1, wherein the power device comprises a plurality of power devices, and wherein the host controller is coupled to each power device of the plurality of power devices over individual peer-to-peer connections.

13. A method for utilizing status information for a power device, the method comprising:
 receiving a command from a host controller to monitor for a specified event;
 waiting for an occurrence of the specified event;
 retrieving the status information directly from the power device;
 processing the status information to generate statistical analysis information, wherein the statistical analysis information is a smaller amount of data than the status information;
 storing the statistical analysis information in a memory;
 transferring the statistical analysis information from the memory to the host controller; and
 receiving, from the host controller, instructions adjusting an operation of the power device based on the statistical analysis information.

14. The method of claim 13, further comprising after retrieving the status information, assigning a time stamp to the status information.

15. The method of claim 13, wherein performing statistical analysis comprises analyzing the status information and status information already stored in the memory.

16. The method of claim 13, wherein the specified event includes a specified time, a specified time duration, a signal reaching, rising above, or falling below a specified value, a measured value reaching, rising above, or falling below a specified value, a computed value reaching, rising above, or falling below a specified value, or a request.

17. A method for operating a power device, the method comprising:
 receiving status information directly from the power device;
 processing the status information to generate statistical analysis information, wherein the statistical analysis information is a smaller amount of data than the status information;
 storing the statistical analysis information in a memory;
 receiving a command from a host controller to monitor for an information retrieval event;
 monitoring for the information retrieval event; and
 upon occurrence of the information retrieval event,
  sending the statistical analysis information from the memory to the host controller, and
  receiving a command from the host controller to adjust the power device based on the statistical analysis information.

18. The method of claim 17, wherein processing the status information comprises analyzing output voltage and current information, and wherein adjusting the power device comprises adjusting component tolerances until the output voltage and current meet output requirements.

19. The method of claim 17, wherein processing the status information comprises computing and analyzing a voltage level, and wherein adjusting the power device comprises adjusting a number of decoupling capacitors coupled to the power device.

20. The method of claim 17, wherein processing the status information comprises analyzing output voltage and current information, and wherein adjusting the power device comprises adjusting a control loop or load.

21. A method for operating a power device, the method comprising:
 storing status information received from the power device in a memory coupled to the power device;
 specifying an information retrieval event; and
 upon occurrence of the information retrieval event,
  retrieving the status information from the memory coupled to the power device,
  processing the status information, and adjusting the power device based on the processed status information, wherein processing the status information comprises computing and analyzing an average activation time for the power device, and wherein adjusting the power device comprises rescheduling an activation priority for the power device.

* * * * *